United States Patent [19]
Liang

[11] Patent Number: 5,808,859
[45] Date of Patent: Sep. 15, 1998

[54] CIRCUIT BREAKER BOX

[76] Inventor: Shih-Tsung Liang, No. 10, Lane 31, Ta-Feng St., Lu-Chu Hsiang, Taoyuan County, Taiwan

[21] Appl. No.: 770,292

[22] Filed: Dec. 20, 1996

[51] Int. Cl.⁶ ..................................................... H02B 1/04
[52] U.S. Cl. ........................ 361/673; 361/642; 361/646; 361/837; 439/830; 439/250; 439/698; 174/52.1
[58] Field of Search .................................... 361/626, 642, 361/646, 673, 833, 837; 439/249, 250, 621, 698, 830; 174/52.1

[56] References Cited

U.S. PATENT DOCUMENTS

| | | | |
|---|---|---|---|
| 5,049,095 | 9/1991 | Gugelmeyer | 439/856 |
| 5,328,392 | 7/1994 | Lin et al. | 439/833 |
| 5,551,894 | 9/1996 | Lin et al. | 439/621 |

Primary Examiner—Michael W. Phillips
Assistant Examiner—Boris L. Chervinsky
Attorney, Agent, or Firm—Morton J. Rosenberg; David I. Klein; Jun Y. Lee

[57] ABSTRACT

A circuit breaker box including a holder base having two wire holder shieldings and pairs of clamping spring plates in the wire holder shieldings, each of the clamping spring plates having a pair of vertical ribs disposed at an inner side, the vertical ribs having a thickness gradually increasing from a bottom side toward a top side; an input wire holder mounted in the first wire holder shielding to hold input lead wires, and a plurality of output wire holders mounted in the second wire holder shielding to hold output lead wires, the input wire holder and output wire holder having pairs of metal contact spring plates respectively inserted into the clamping spring plates of the holder base and stopped between the respective vertical ribs of the respective pairs of clamping spring plates for receiving fuse plugs.

1 Claim, 3 Drawing Sheets

CIRCUIT BREAKER BOX

BACKGROUND OF THE INVENTION

The present invention relates to an improved structure of circuit breaker box which is inexpensive to manufacture, and can positively hold installed fuse plugs in position.

FIGS. 4 and 5 show a circuit breaker box according to the prior art. This structure of circuit breaker box comprises a holder base 5, a bottom plate 52 covered on the holder base 5 at the bottom, a top cover shell 51 covered on the holder baser 5 at the top, two rows of lead wire holders 53 respectively and bilaterally fastened to the holder base 5 by screws 55 to hold input or output lead wires, and a plurality of metal contact clamping plates 54 respectively fastened to the lead wire holders 53 by screws for receiving fuse plugs 4. Each metal contact clamping plate 54 comprises an elongated base plate 541 fixedly connected to one lead wire holder 53, and two curved clamping arms 542 bilaterally raised from the base plate 541 at one end. This structure of circuit breaker box has drawbacks. In order to provide sufficient clamping force, phosphor bronze is used to make the metal contact clamping plates 54. However, because phosphor bronze is expensive and complicated to process, the manufacturing cost of the metal contact clamping plates is high. Furthermore, because the lead wire holders 53 and the metal contact spring plates 54 are separately fabricated and then fastened together by screws, the assembly process of the circuit breaker box consumes much labor, and the metal contact spring plates 54 tend to be forced out of position, causing a contact error.

SUMMARY OF THE INVENTION

The present invention has been accomplished to provide an improved structure of circuit breaker box which eliminates the aforesaid drawbacks. According to the preferred embodiment of the present invention, the circuit breaker box comprises a holder base having two wire holder shieldings and pairs of clamping spring plates in the wire holder shieldings, each of the clamping spring plates having a pair of vertical ribs disposed at an inner side, the vertical ribs having a thickness gradually increasing from a bottom side toward a top side; an input wire holder mounted in the first wire holder shielding to hold input lead wires, and a plurality of output wire holders mounted in the second wire holder shielding to hold output lead wires, the input wire holder and output wire holder having pairs of metal contact spring plates respectively inserted into the clamping spring plates of the holder base and stopped between the respective vertical ribs of the respective pairs of clamping spring plates for receiving fuse plugs. Because the metal contact spring plates are respectively integrally made in the input wire holder and output wire holders, the metal contact spring plates do not displace when the input wire holder and output wire holders are respectively fixed to the holder base. Because the metal contact spring plates of the input wire holder and output wire holders are supported on the vertical ribs of the respective clamping spring plates, they provide sufficient clamping force to hold down installed fuse plugs.

DETAILED DESCRIPTION OF THE PREFERRED EMBODIMENT

Figure 1:
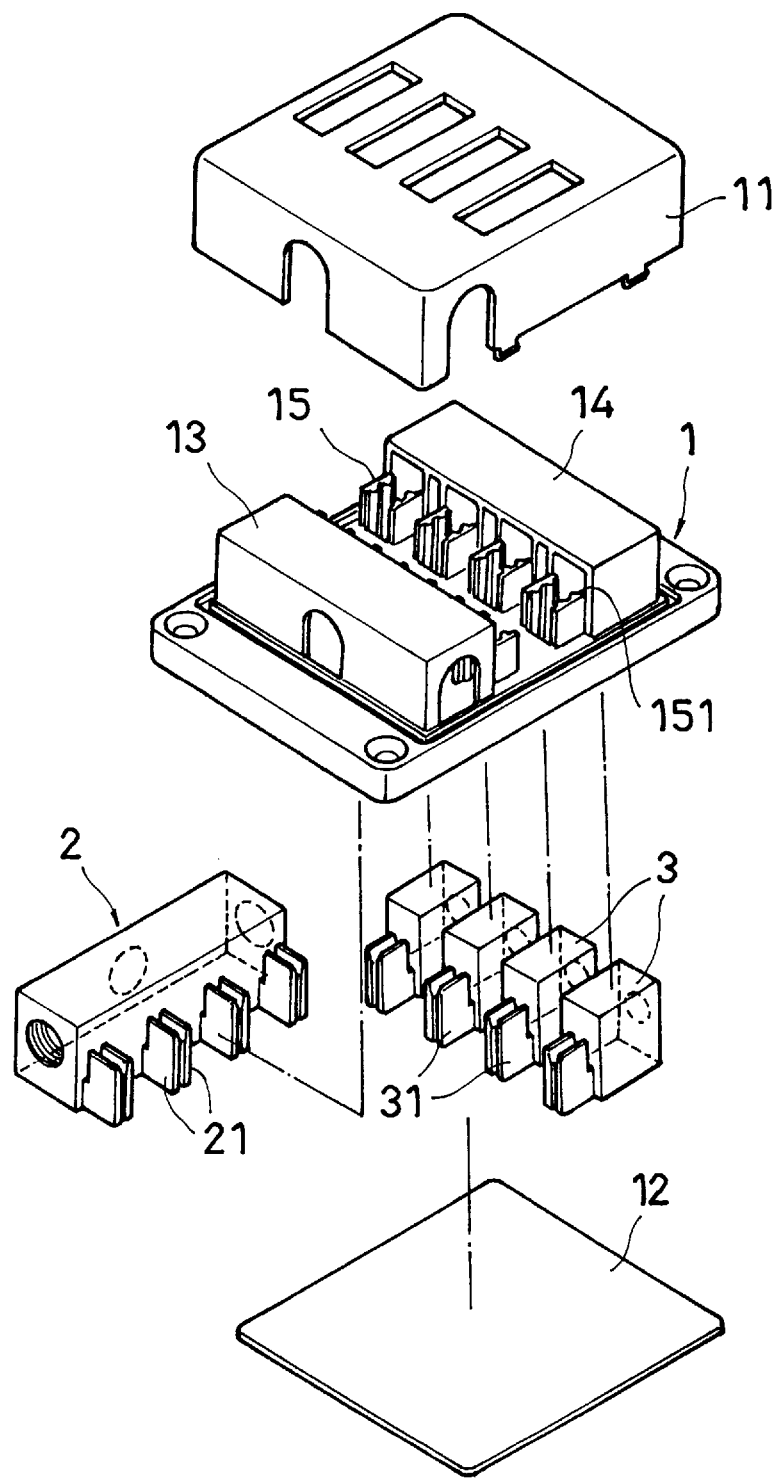
FIG. 1 is an exploded view of a circuit breaker box according to the present invention.
Figure 2:
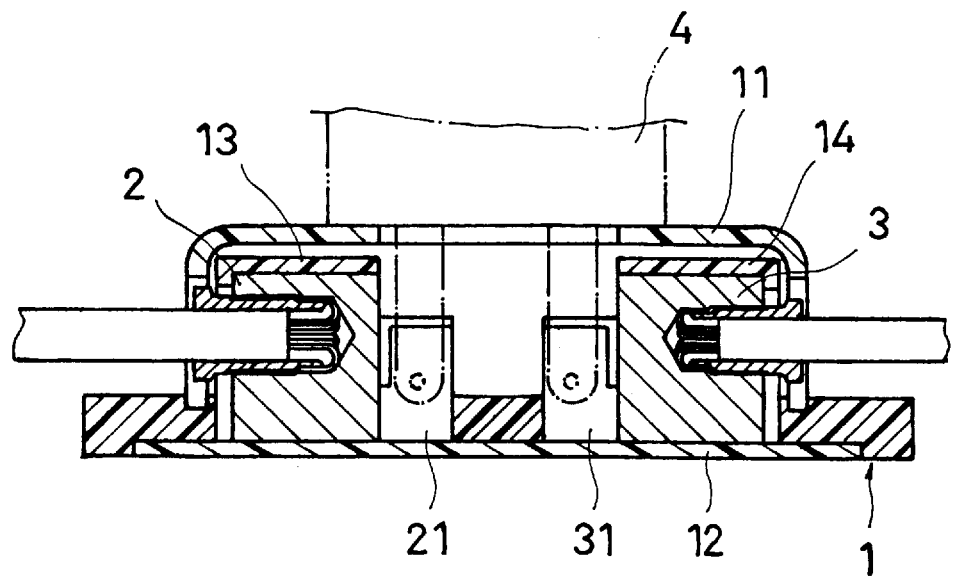
FIG. 2 is a sectional assembly view of the circuit breaker box shown in FIG. 1.

Referring to FIGS. 1 and 2, a circuit breaker box in accordance with the present invention is generally comprised of a holder base 1, a bottom plate 12 covered on the holder base 1 at the bottom, a top cover shell or casing 11 covered on the holder baser 1 at the top, an in put wire holder 2 and a plurality of output wire holders 3 respectively mounted inside the holder base 1. The top cover shell 11 is fastened to the holder base 1 by for example hooks. The bottom plate 12 is fastened to the bottom recessed bottom side of the holder base 1 by plugging. The holder base 1 comprises a first wire holder shielding 13 and a second wire holder shielding 14 bilaterally raised from the top, and pairs of clamping spring plates 15 respectively disposed in the wire holder shieldings 13, 14. Each of the clamping spring plates 15 has a pair of vertical ribs 151 disposed at an inner side. The vertical ribs 151 have a thickness gradually increasing from the bottom toward the top. The input wire holder 2 is mounted within the first wire holder shielding 13 to hold input lead wires, having pairs of metal contact spring plates 21 respectively inserted into the pairs of clamping spring plates 15 in the first wire holder shielding 13. The output wire holders 3 are mounted within the second wire holder shielding 14 to hold output lead wires, having pairs of metal contact spring plates 31 respectively inserted into the pairs of clamping spring plates 15 in the second wire holder shielding 14.

Figure 3:
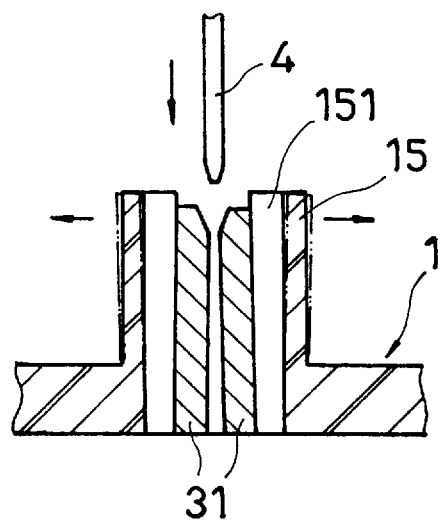
FIG. 3 is a sectional view in en enlarged scale of a part of the present invention, showing the insertion of a fuse plug in one pair of metal contact spring plates of one output wire holder according to the present invention.
Figure 4:
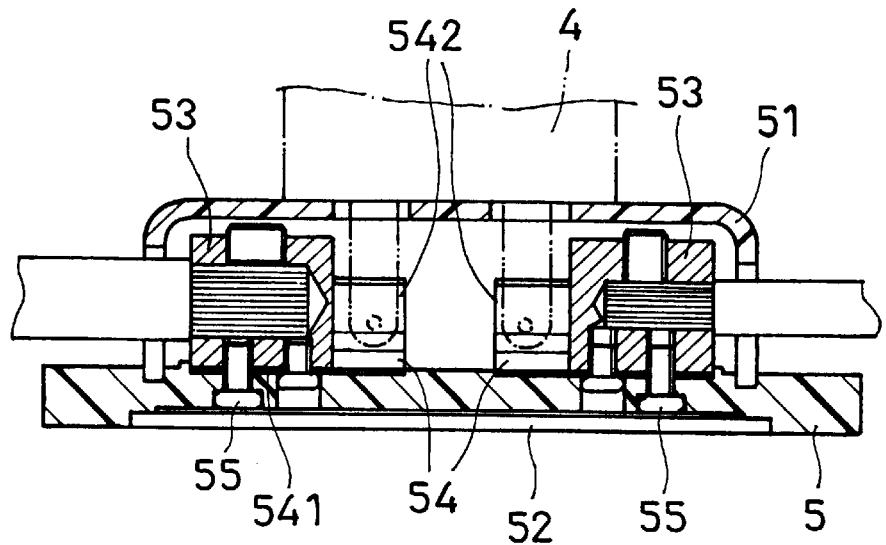
FIG. 4 is a sectional assembly view of a circuit breaker box according to the prior art.
Figure 5:
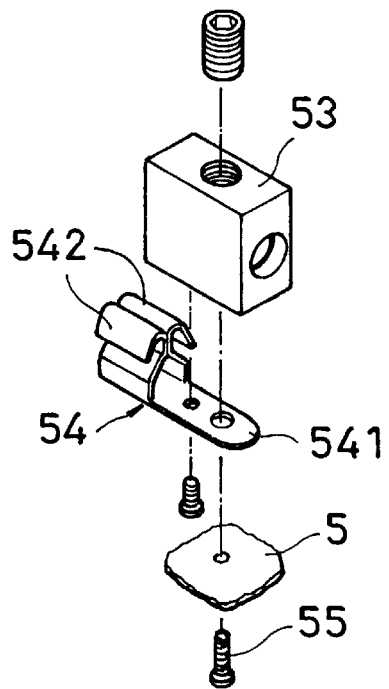
FIG. 5 is an exploded view of a part of FIG. 4.

Referring to FIG. 3 and FIG. 2 again, when the input wire holder 2 and the output wire holders 3 are respectively mounted in the first wire holder shielding 13 and second wire holder shielding 14 of the holder base 1, the pairs of metal contact spring plates 21, 31 of the input wire holder 2 and output wire holders 3 are respectively retained in the pairs of clamping spring plates 15 of the holder base 1 and stopped between the respective vertical ribs 151. Because the vertical ribs 151 have a thickness gradually increasing from the bottom toward the top, each pair of metal contact spring plates 21 or 31 are respectively forced inwards by the respective vertical ribs 151. Therefore, when a fuse plug 4 is inserted into the circuit breaker box, the respective metal contact spring plates 21, 31 are forced to push the corresponding clamping spring plates 15 of the holder base 1 outwards to produce a springy force, causing the fuse plug 4 to be firmly retained in position.

While only one embodiment of the present invention has been shown and described, it will be understood that various modifications and changes could be made thereunto without departing from the spirit and scope of the invention disclosed.

What the invention claimed is:

1. A circuit breaker box comprising:

a holder base covered within a casing, said holder base comprising a first wire holder shielding and a second wire holder shielding bilaterally raised from a top side thereof, and pairs of clamping spring plates respectively disposed in said first and second wire holder shieldings, each of said clamping spring plates having a pair of vertical ribs disposed at an inner side, said vertical ribs having a thickness gradually increasing from a bottom side toward a top side;

an input wire holder mounted within said first wire holder shielding to hold input lead wires, said input wire holder having pairs of metal contact spring plates respectively inserted into the pairs of clamping spring plates in said first wire holder shielding and stopped between the respective vertical ribs of the respective pairs of clamping spring plates in said first wire holder shielding for receiving fuse plugs; and a plurality of output wire holders respectively mounted within said second wire holder shielding to hold output lead wires, having pairs of metal contact spring plates respectively inserted into the pairs of clamping spring plates in said second wire holder shielding and stopped between the respective vertical ribs of the respective pairs of clamping spring plates in said second wire holder shielding for receiving fuse plugs.

* * * * *